US006742964B2

(12) United States Patent
Fukui (10) Patent No.: US 6,742,964 B2
(45) Date of Patent: *Jun. 1, 2004

(54) METHOD FOR INSTALLING CONDUIT OR THE LIKE ON MOUNTAINSIDE (76) Inventor: Tomio Fukui, 18-5, Kamiuma 4-chome, Setagaya-ku, Tokyo 154-0011 (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/440,748

(22) Filed: May 19, 2003

(65) Prior Publication Data
US 2003/0194276 A1 Oct. 16, 2003

Related U.S. Application Data (63) Continuation of application No. 09/647,446, filed as application No. PCT/JP00/00458 on Jan. 28, 2000, now Pat. No. 6,588,984.

(51) Int. Cl.$^7$ ................. F16L 3/00; F16L 3/22
(52) U.S. Cl. ................. 405/184.4; 405/154.1; 405/178; 405/184.5; 138/106; 138/107; 212/87; 212/94
(58) Field of Search .................. 405/119, 124, 405/126, 154.1, 174, 178, 184.4, 184.5; 138/103, 106, 107; 212/76, 87, 94

(56) References Cited

U.S. PATENT DOCUMENTS

| 2,034,928 | A | * | 3/1936 | John ........................ 138/107 |
| 2,091,265 | A | * | 8/1937 | Brown ....................... 138/107 |
| 2,962,599 | A | * | 11/1960 | Pirkey ........................ 290/4 R |
| 3,248,884 | A | * | 5/1966 | Bender ..................... 405/184.4 |
| 3,810,364 | A | * | 5/1974 | Johnson ................... 405/184.4 |
| 4,073,157 | A | * | 2/1978 | Aylmer et al. ............. 405/170 |
| 4,454,951 | A | * | 6/1984 | Kuehn ......................... 212/76 |
| 4,687,109 | A | * | 8/1987 | Davis .......................... 212/76 |
| 4,735,327 | A | * | 4/1988 | Biller et al. .................. 212/92 |
| 4,842,314 | A | * | 6/1989 | Bellow ......................... 294/74 |
| 6,145,679 | A | * | 11/2000 | Walters ....................... 212/76 |
| 6,247,873 | B1 | * | 6/2001 | Fukui ........................... 405/17 |
| 6,588,984 | B1 | * | 7/2003 | Fukui ....................... 405/184.4 |

FOREIGN PATENT DOCUMENTS

| DE | 19521289 | * | 12/1996 |
| JP | 08291880 | * | 11/1996 |
| WO | 98/17869 | * | 4/1998 |

OTHER PUBLICATIONS

International Search Report, Intl. Application No. PCT/JPO/00458, mailed on Apr. 21, 2000 et al.; IEEE Press, New York, NY 1997.

* cited by examiner

*Primary Examiner*—Jong-Suk (James) Lee
(74) *Attorney, Agent, or Firm*—Bromberg & Sunstein LLP (57) ABSTRACT

A method for installing conduits on a mountain is provided. The method includes placing at least one cable longitudinally across a ridge of the mountain and installing the at least one cable on a front side and a back side of the mountain. The front and back sides of the mountain are bounded by the ridge, and the at least one cable crosses over the ridge. The cable is positioned along both the front side and the back side of the mountain. At least one conduit is moored to the at least one cable on the front side of the mountain, and at least one cable is anchored on the back side of the mountain.

20 Claims, 8 Drawing Sheets

METHOD FOR INSTALLING CONDUIT OR THE LIKE ON MOUNTAINSIDE

This application is a continuation of U.S. patent application Ser. No. 09/647,446 filed Nov. 14, 2000, now U.S. Pat No. 6,589,984 which is a National Phase application of PCT/JP00/00458 which claims priority from International Application No. PCT/JP99/00362 filed Jan. 28, 1999 all of which are incorporated herein by reference.

FIELD OF THE INVENTION

The present invention relates to a method for placing and fixing conduits. For purposes of this disclosure, a conduit will be defined as any inlet, pipe, duct, or multi-purpose duct, whether above ground or underground, such as Hume pipes, underground multipurpose ducts, inlets that connect the Hume pipes or ducts, for water, sewage, fuel gases, or electric wiring on mountainsides of even a high mountain. This invention can be used to install water pipes, sewerage pipes etc. to a hotel that is built on a high mountain, a mountain cottage, a facility for weather observation and other buildings and facilities.

PRIOR ART

If a number of conduits are merely connected to each other and positioned or buried under mountainsides, possibly they would move downward, bend, or break, because of forces caused by the dead load, falling stones, rain, snow. Thus, it is desirable that, to prevent those conditions from being generated, bases be located below the conduits, or bars or rails be located beside the conduits so that the conduits can be fixed by them and prevented from moving and sliding on the mountainsides. Also, conduits can be installed on the mountainsides over long distances.

SUMMARY OF INVENTION

The inventor considered that cables could be used to fix conduits on mountainsides. That is, he considered that cables would be useful to resist forces that cause conduits to slide on mountainsides, because the cables are made of materials that have a tensile force and strength that can resist the forces. The reason the inventor so considered this is that some cables that axe commercially available have a tensile force and strength that is effective to such an extent that a great suspension bridge can be supported. Another reason is that cables axe flexible so that they can be easily wound around conduits that have curved surfaces and they can be easily wound around inlets that connect conduits to each other.

Even if conduits etc. can be fixed by cables, the conduits cannot be securely fixed to mountainsides when the cables axe not securely fixed to the mountainsides. Thus, the inventor studied anchors. As a result, he conceived this invention.

Thus, a first embodiment of this invention relates to a method for installing conduits on a mountain using cables, comprising the steps of making at least one cable cross over the ridge of the mountain, installing said at least one cable on a mountainside and another mountainside opposite it ("the opposite mountainside") that is bounded by the ridge of the mountain from that mountainside by having the cable cross over the ridge, positioning the cable along both mountainsides, mooring (which may be accomplished directly or indirectly through one or more devices) conduits, through which water, fuel gases, electric wiring etc. pass, to the longitudinal cable that is installed on one mountainside, and connecting the longitudinal cable that is installed on the opposite mountainside to a heavy object or a base point fixed to the mountain that acts as an anchor.

A second embodiment of this invention relates to a method for installing conduits on mountains using cables, comprising the steps of positioning at least one cable ("longitudinal cable") on a mountainside along its slope, directly or indirectly mooring conduits, through which water, fuel gases, electric wiring etc. pass, to the longitudinal cable, and connecting one end of the longitudinal cable to a base point that is fixed to the ridge or the mountain top.

A third embodiment of this invention relates to a method for installing conduits on mountains using cables, comprising the steps of installing a cable for an anchor ("anchor cable") around and near the top of a mountain that is generally conical, connecting at least one cable ("the longitudinal cable") to the anchor cable, installing the longitudinal cable on the slope of the mountainside, and directly or indirectly mooring conduits, through which water, fuel gases, electric wiring, etc. pass, to the longitudinal cable.

The above description describing that the conduits axe moored by the longitudinal cable indicates, for example, that the conduits can be moored to the longitudinal cable by a mooring cable.

Two or more longitudinal cables can be used Also, at least one cable ("the lateral cable") can be used to connect the two or more longitudinal cables.

In that case, conduits may be directly moored by the two or more longitudinal cables and the at least one lateral cable. Also, the conduits may be indirectly moored to those cables by, for example, a mooring cable.

The vertical cable may branch.

In the first embodiment, conduits may be used as a heavy object to act as an anchor.

In the first embodiment of this invention, the anchor function that is needed to fix the conduits is achieved by connecting one of the longitudinal cables, which crosses over the ridge of the mountain to be longitudinally positioned on both mountainsides, to the conduits and by connecting the other to the heavy object that acts as an anchor so that the conduits and the heavy object that acts an anchor may be arranged like a kayak. This method allows the strength of the anchor to resist both the force that causes the conduits to move and the tensile force working against the cables. The strength of the anchor increases as the height of the mountain increases (or the length of the cables or the friction between the cable and the ground of the mountainside) and the weight of the heavy object (or an anchor) that is connected to the cable increases. Also, when the cable is connected to the base points fixed to the mountain instead of the heavy object that acts as an anchor, a similar strength for the anchor can be achieved.

The strength of the anchor of the second embodiment of this invention tends to be less than that of the first embodiment. Thus, when there is no need to use the relatively great strength of an anchor, the second embodiment is used.

If the mountain is generally conical, the third embodiment can be used to achieve a relatively great strength for the anchor.

Also, the inventor considered that possibly the conduits could be bent or broken by a shock such as an earthquake at some places where the conduits were installed, even if the conduits were to be connected and installed according to the first, second, and third embodiments of this invention. Thus, the inventor considered that such an accident could be avoided if a base or a frame were to be used and if it were to be moored by a cable, when the conduits could not help being installed at a place where possibly an accident might occur because of a shock such as an earthquake, to bend or break the conduits.

Thus, a fourth embodiment of this invention relates to a method for installing conduits on a mountain using cables, comprising the steps of making at least one cable pass over the ridge of the mountain, installing said at least one cable on a mountainside and another mountainside opposite it ("opposite mountainside") that is bounded by the ridge of the mountain from that mountainside by passing the cable over the ridge, positioning the cable along both mountainsides, directly or indirectly mooring a base, such as a base plate or a frame member to which right and left side plates are attached to the longitudinal cable that is positioned on one of the mountainsides, positioning on the base conduits, or inlets ("conduits etc."), through which water, fuel gases, electric wiring etc. pass, fixing the conduits to the base or the side plates, and connecting the longitudinal cable that is installed on the opposite mountainside to a heavy object or a base point fixed to the mountain that acts as an anchor.

A fifth embodiment of this invention relates to a method for installing conduits on mountains using cables, comprising the steps of positioning at least one cable (longitudinal cable") on a mountainside along its slope, directly or indirectly mooring a bases, such as a base plate or a frame member, to which right and left side plates are attached to the longitudinal cable, positioning on the base conduits, through which water, fuel gases, electric wiring etc. pass, fixing the conduits etc. to the base or the side plates, and connecting one end of the longitudinal cable to a base point that is fixed to the ridge or the mountain top.

A sixth embodiment of this invention relates to a method for installing conduits on mountains using cables, comprising the steps of installing a cable for an anchor ("anchor cable") around and near the top of a mountain that is generally conical, connecting at least one cable (longitudinal cable") to the anchor cable, installing the longitudinal cable on a slope of a mountain, directly or indirectly mooring a base, such as a base plate or a frame member, to which right and left side plates are attached to the longitudinal cable, positioning on the base conduits, through which water, fuel gases, electric wiring etc. pass, and fixing the conduits to the base or the side plates.

The base maybe moored by one longitudinal cable. However, preferably one base is moored to two or more longitudinal cables, especially to two longitudinal cables.

Mooring the base to the longitudinal cable indirectly can be achieved by, for example, using a cable that is positioned at an angle ("lateral cable") relative to the longitudinal direction of the longitudinal cable (e.g., 90 degrees), connecting the base to the lateral cable, and connecting the lateral cable to the longitudinal cable, thereby mooring the base to the longitudinal cable. In this case there is no limitation in the number of longitudinal cables that can be connected to the lateral cable. However, usually two longitudinal cables are used.

Two or more longitudinal cables can be used. Also, at least one additional lateral cable can be used to connect the longitudinal cables.

The longitudinal cable may branch.

Below the preferred embodiments of this invention are explained based on the following drawings wherein.

EMBODIMENTS

Figure 1:
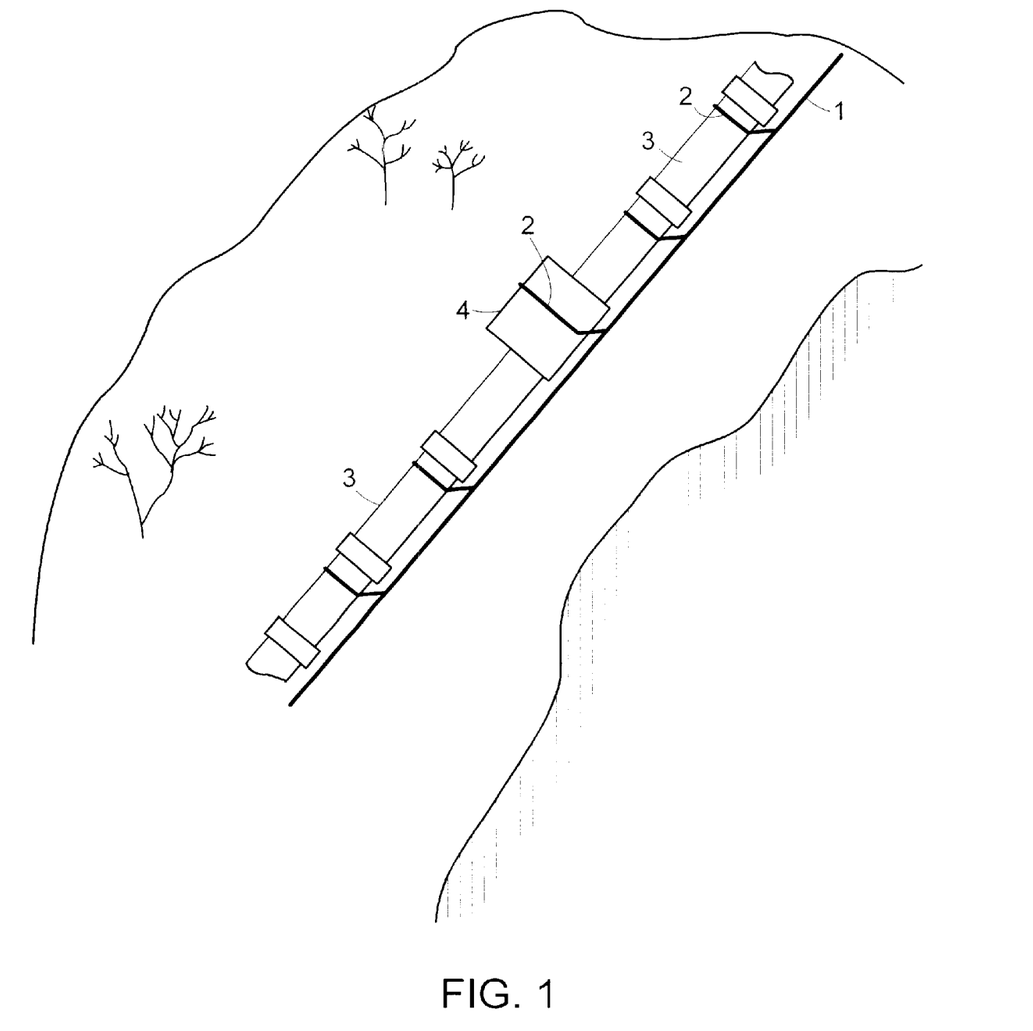
FIG. 1 is a schematic view to show a mountainside and one embodiment of the present invention.
Figure 2:
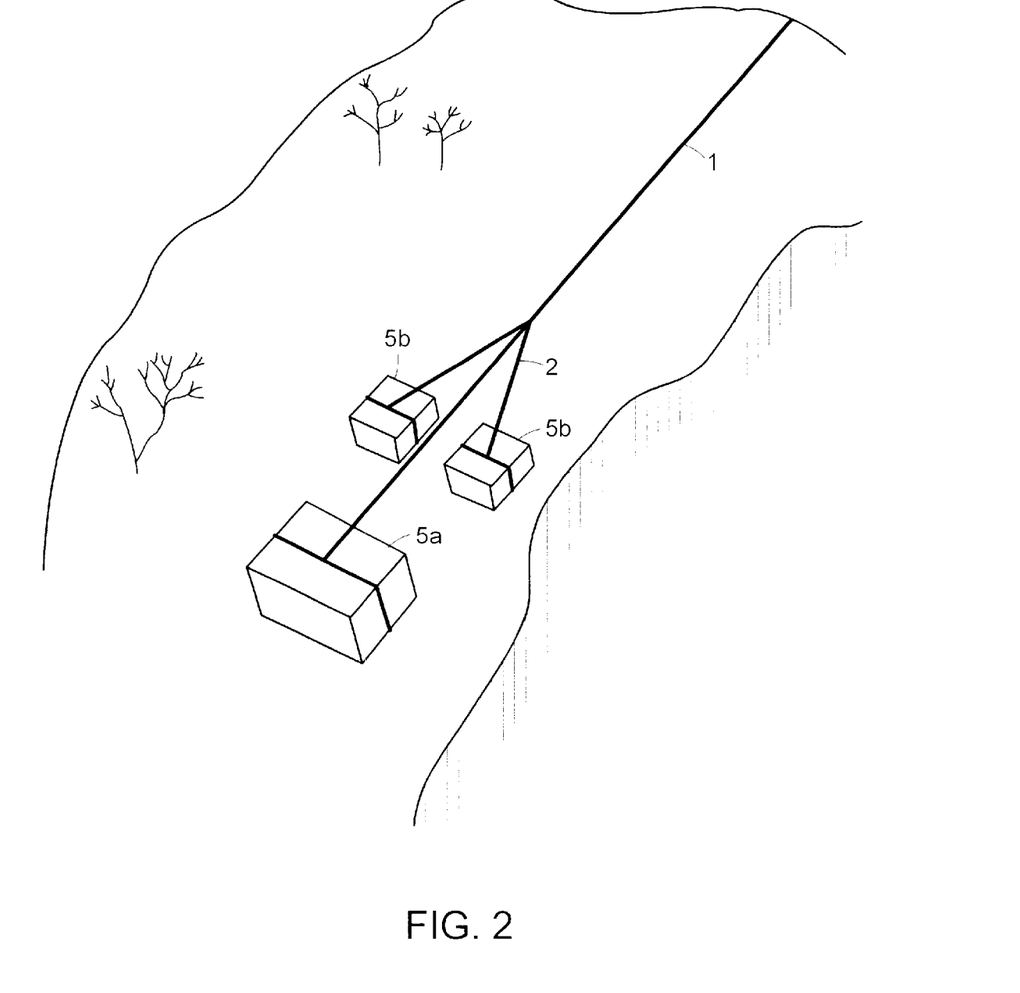
FIG. 2 is a schematic view similar to FIG. 1 to show the other mountainside (that is opposite the mountainside in FIG. 1).

In the embodiment in FIGS. 1 and 2, one cable 1 (a longitudinal cable) crosses over a ridge of a mountain and hangs down both mountainsides. On the one mountainside shown in FIG. 1 ("the front mountainside"), conduits 3 and inlets 4 are moored to mooring cables 2 that are connected to the longitudinal cable 1. On the other mountainside, shown in FIG. 2 ("the rear mountainside"), a heavy object 5a, which acts an anchor, is moored by the longitudinal cable 1. Also, other heavy objects 5b are moored to the longitudinal cable 1 by the mooring cables 2. The tensile stresses on the cable are balanced on both mountainsides. Thus, the conduits 3 and the inlets 4 can be stably held at fixed positions.

Figure 3:
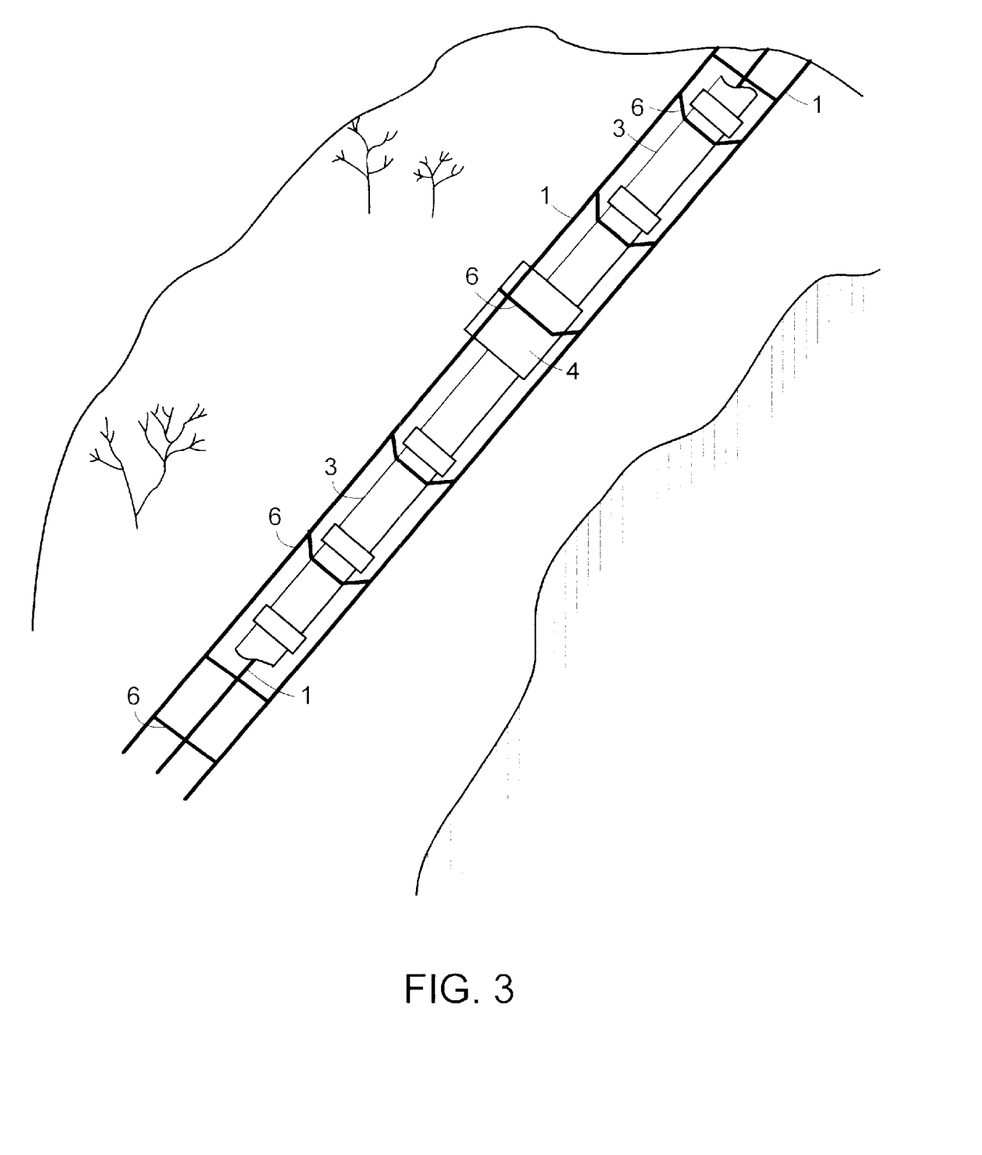
FIG. 3 is a schematic view to show a mountainside and another embodiment of the invention

FIG. 3 shows another embodiment of this invention, where the diameter of the conduit is relatively great. In this case three longitudinal cables 1 are positioned in parallel along the mountainside. Lateral cables 6 are connected between the longitudinal cables 1. The conduits 3 and inlets 4 are moored by the lateral cables 6. In this case the heavy objects may be moored by the longitudinal cable 1 on the rear mountainside. Alternatively, the longitudinal cable 1 may be connected to a certain base point that is fixed on the top or a ridge of a mountain, or the backside of a mountain.

Figure 4:
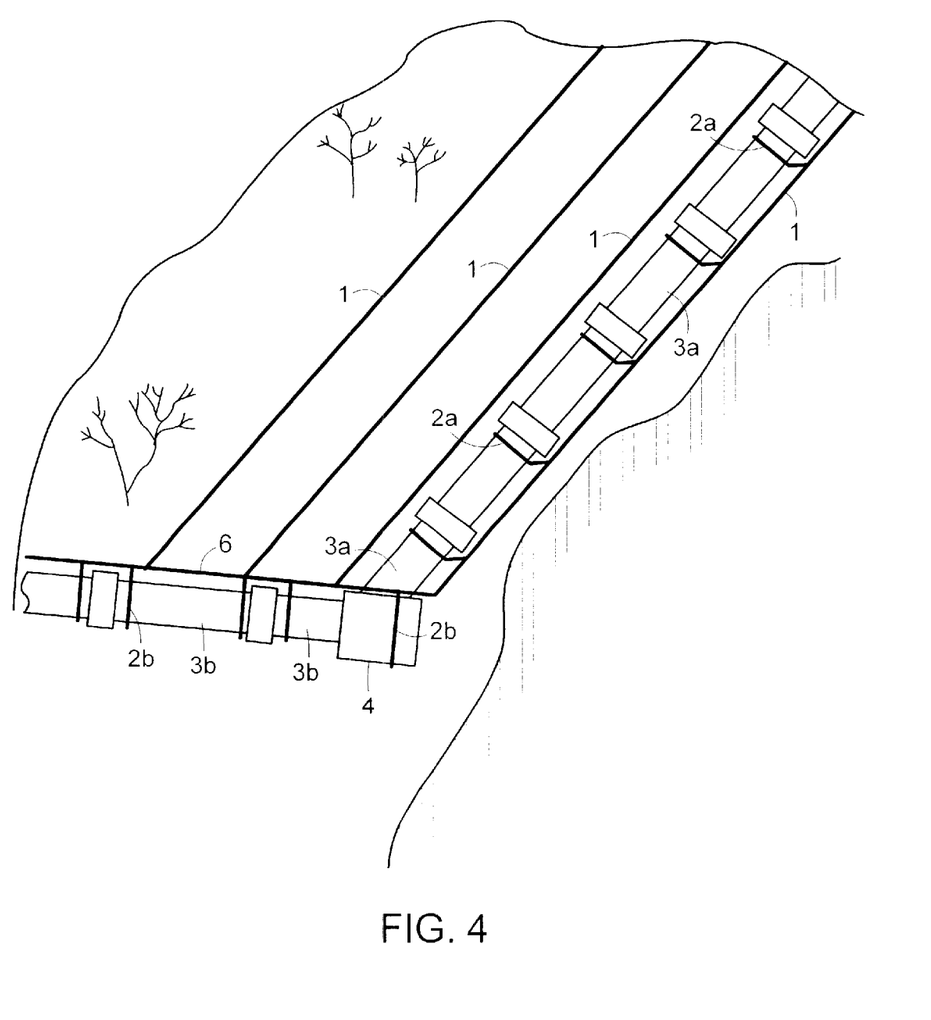
FIG. 4 is a schematic view to show a mountainside and still another embodiment of the invention.

FIG. 4 shows still another embodiment of the invention. In this case the conduits are positioned along topographic features of the mountainside so that they are not arranged straight from the top of the mountain toward its bottom, but change direction. That is, the conduits 3a are arranged from the top of the mountain toward its bottom, and are moored by the mooring cables 2a. The mooring cables 2a are connected to the longitudinal cable 1. The lowest end of a series of the conduits 3a is connected to the inlet 4. At the inlet 4 the series of the conduits changes course. That is, a series of conduits 3b is laterally positioned and connected to the inlet 4. The conduits 3b are moored by the mooring cables 2b. The mooring cables 2b are connected to a lateral cable 6. The lateral cable 6 extends across the longitudinal cables 1 and is connected to them. In this case, heavy objects may be moored by the longitudinal cables 1 to the rear mountainside. Alternatively, the longitudinal cable 1 may be connected to a certain base point that is fixed on the top or ridge of a mountain, or the backside of a mountain.

Figure 6:
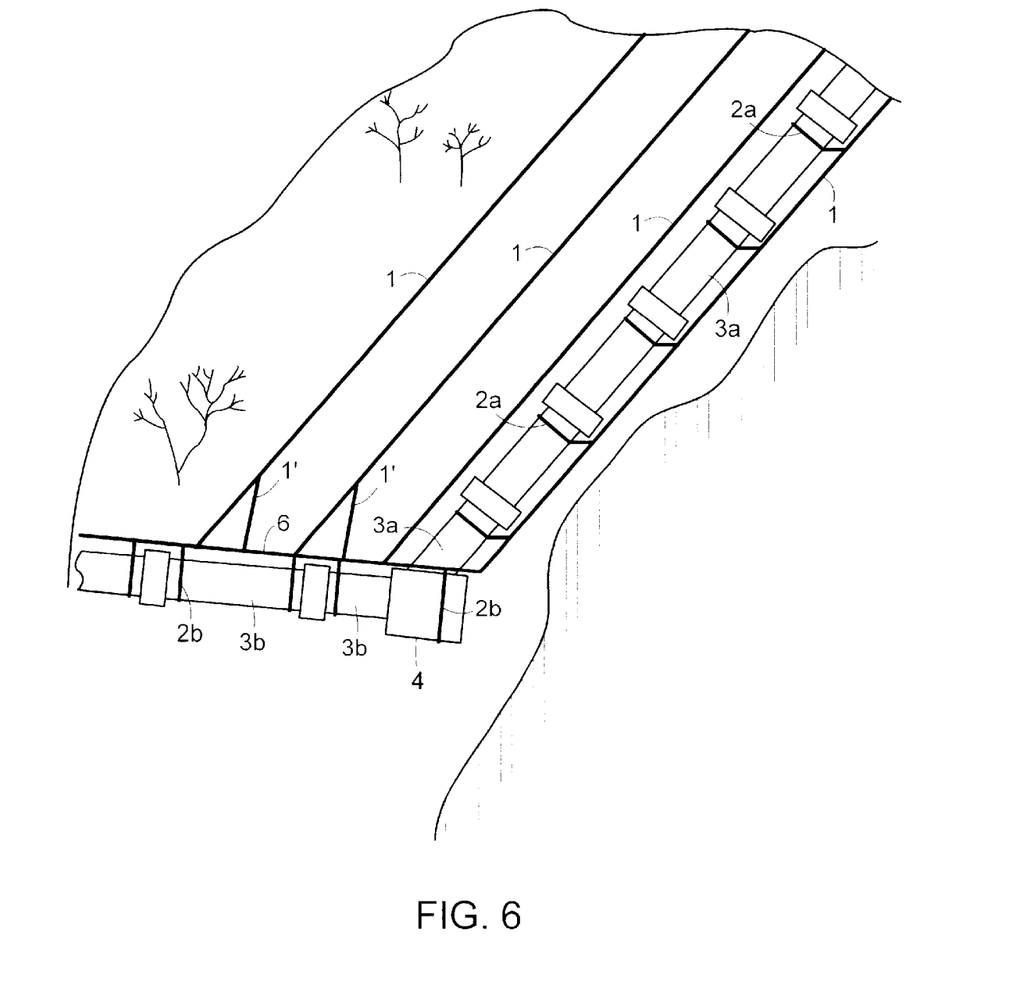
FIG. 6 is a schematic view to show a modification of the embodiment of the invention as shown in FIG. 4.

As in FIG. 6, each longitudinal cable may comprise a basic part 1 and a branching part 1'. This construction allows the conduits 3b and the inlets 4 to be firmly moored.

When a mountain has a peak and does not have any long ridge, and is generally conical, like Mt. Fuji, the third embodiment of the method of this invention for installing conduits can be used.

Figure 5:
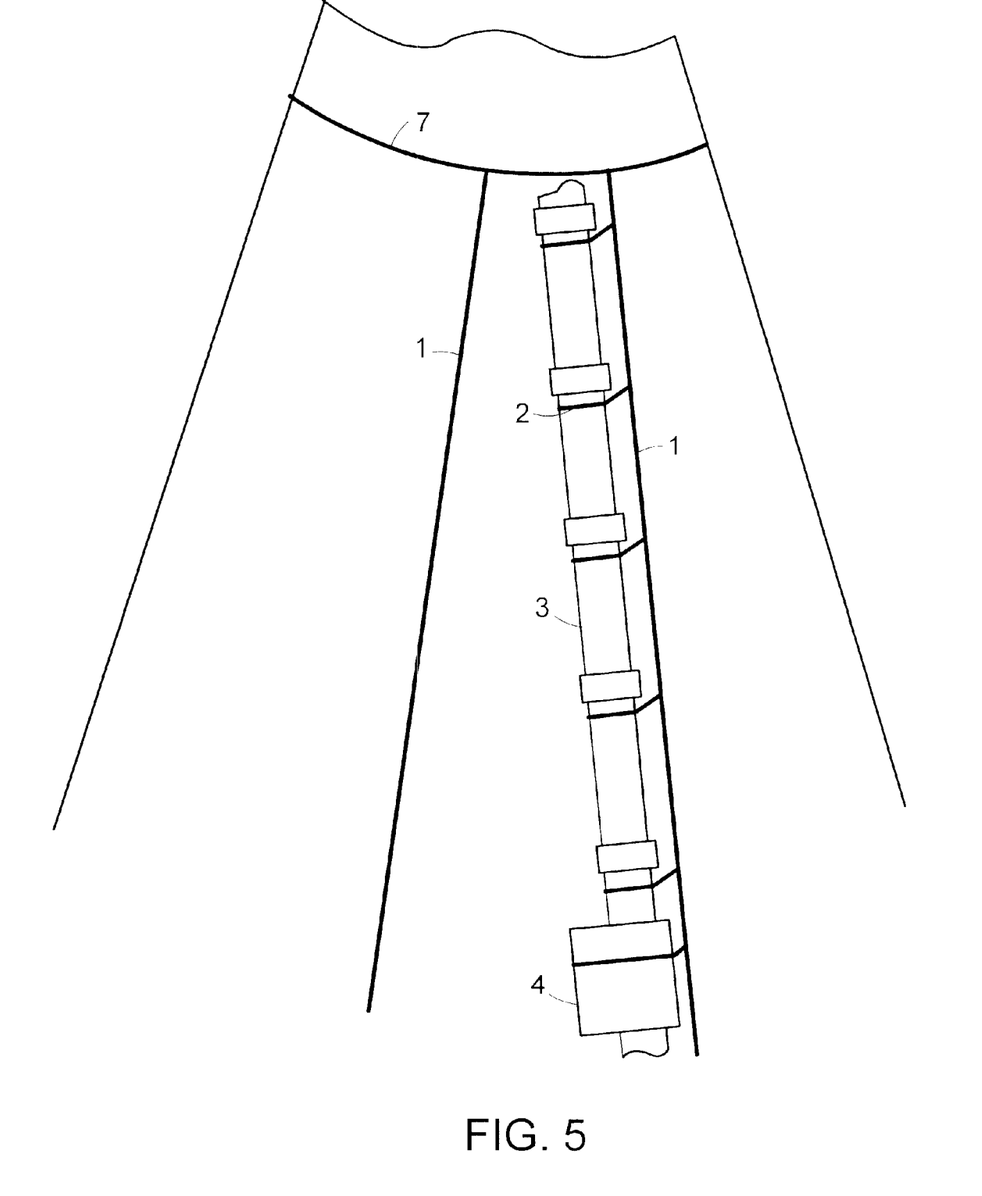
FIG. 5 is a schematic view to show still another embodiment of the invention.

That is, as in FIG. 5, a cable 7 is wound around near the top of a mountain. The cable 7 is used as an anchor. The longitudinal cables 1 are connected to the cable 7. The longitudinal cables 1 are suspended along the mountainside. The conduits 3 and inlets 4 are moored by the mooring cables 2. The cables 2 are connected to the longitudinal cables 1.

The conduits according to this invention are used to indicate an inclusive concept that includes a water pipe, a sewage pipe, a gas pipe, and a pipe for electric wiring, an underground multipurpose duct that accommodates them, and an inlet that is used to connect those pipes. The materials for those pipes are not limited.

When the conduits are moored by the cables, they may be directed in any direction. For example, they can be arranged to be directed toward the top of a mountain. Also, like the conduits that are described in FIG. 4 at the lower position, they can, be arranged perpendicularly to the top of a mountain (i.e., laterally). Also, besides the above direction, they can be directed in any other direction.

The conduits may be buried, if necessary. Also, to facilitate the mooring of the conduits by the cables, the surfaces of the conduits may be concave or convex, or both. Also, projections maybe formed on those surfaces.

A conduit (which is not limited to just one) that is positioned at one end of a series of a number of conduits that are connected to each other may be directly connected to conduits arranged in a building, or indirectly connected to the building through branch ducts. Also, a conduit (which is also not limited to just one) that is positioned at the other end may be directly connected to various facilities according to its purposes (alternatively, the series of the conduits may be made to extend from the facilities). When a number of conduits are connected in series to reach fat land, the conduits can be installed on the flat land in any way that is known by one skilled in the art.

The cables can interlock with each other. Also, they can be connected to each other by known connectors.

As an example of the heavy objects that can act an anchor, a block of concrete, a metal block, or a long wire basket filled with rocks can be used. Also, as an example of the base points that are fixed on a mountain, a big tree or a concrete building that is connected to the ground can be used.

Figure 7:
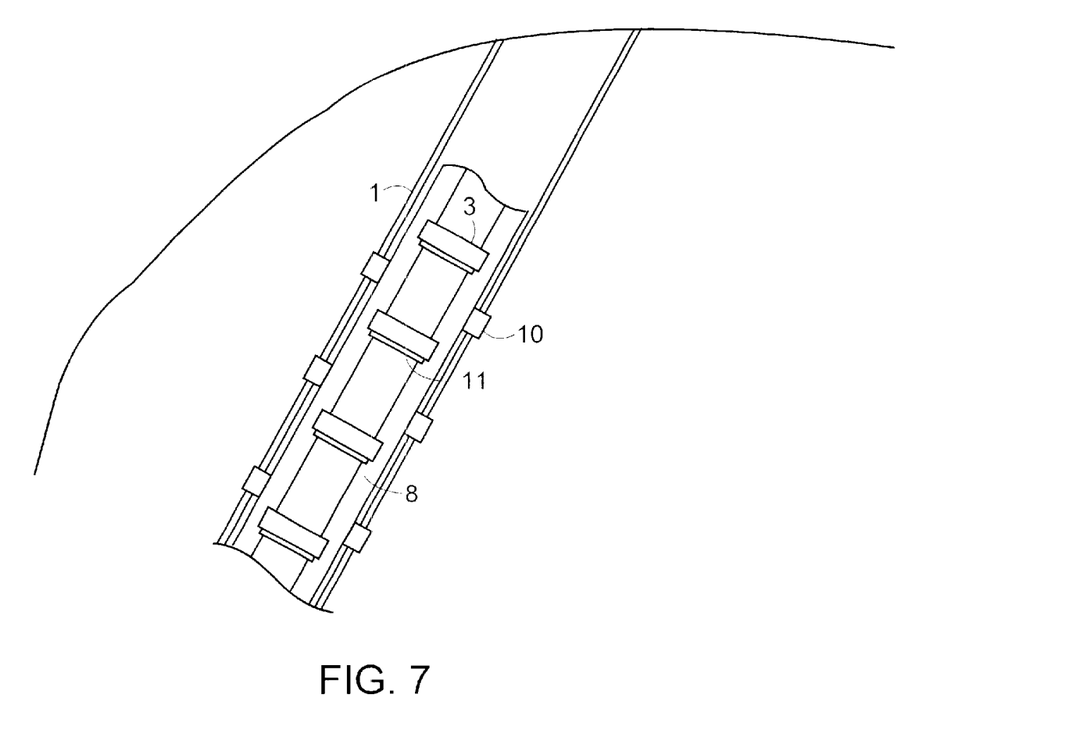
FIG. 7 is a schematic view to show another embodiment of the invention.

In still another embodiment of this invention, as shown in FIG. 7, two longitudinal cables cross over the ridge of a mountain and are longitudinally positioned on both mountainsides. On the one mountainside shown in FIG. 7 (the "front mountainside") a base 8, on which the conduits 3 are fixed, is moored by longitudinal cables. On the other mountainside (the "rear mountainside") a heavy object that acts as an anchor is moored by each longitudinal cable. The tensile stresses against the cable are balanced on both mountainsides. Thus, the base 8, on which the conduits 3 are fixed, can be stably held at fixed positions.

Figure 8:
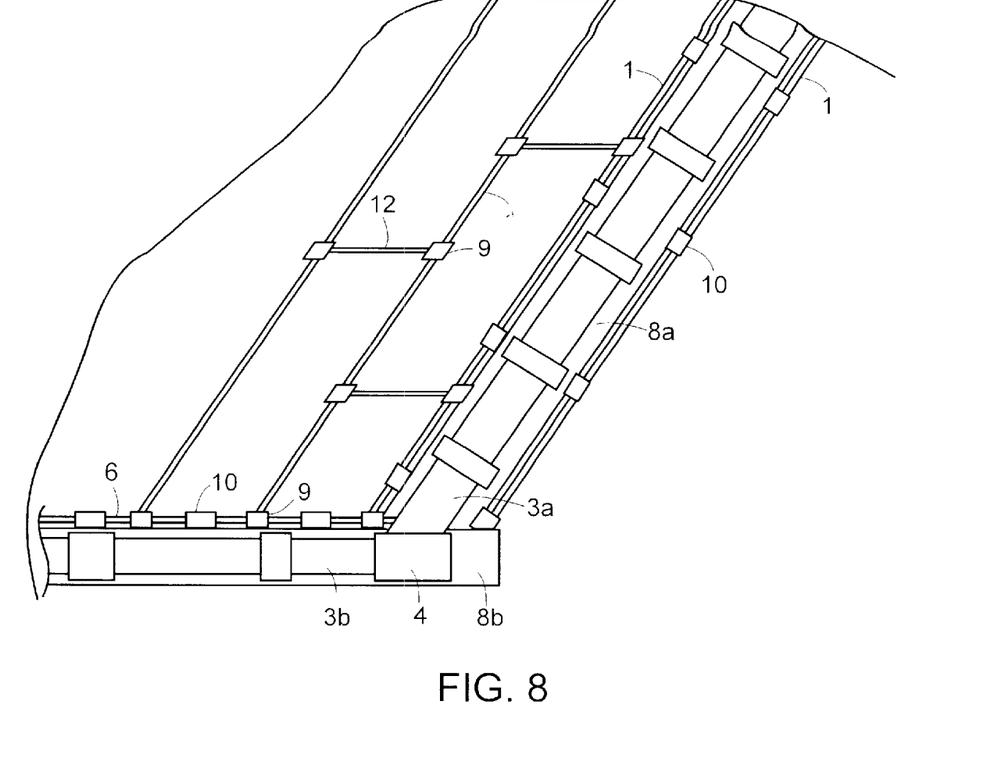
FIG. 8 is a schematic view to show still another embodiment of the invention.

FIG. 8 shows an embodiment according to this invention where bases 8a, 8b are not arranged to run straight from the top of the mountain toward its bottom, but are positioned along topographic features of the mountainside. In this case the base 8a, which is arranged from the top of the mountain toward its bottom, is moored by the two longitudinal cables 1. The lowest end of a series of the conduits 3a is connected to the inlet 4. At the inlet 4 the series of the conduits changes direction. Also, the inlet 4 and the conduits 3b are fixed on the base 8b. The base 8b is moored by the longitudinal cables 1, that are connected to the lateral cables 6. The lateral cables 6 are connected to the base 8b. Lateral cables 12 are positioned between the longitudinal cables 1, to connect them to each other. In this case a heavy object maybe moored by each longitudinal cable 1 to the rear mountainside. Alternatively, each longitudinal cable 1 may be connected to a certain base point that is fixed on the top or ridge of a mountain, or the backside of a mountain. Also, in this case each longitudinal cable 1 may be comprised of a basic part 1 and a branching part 1', as in FIG. 6.

Also, instead of the embodiment as in FIG. 5 where the conduits 3 are directly or indirectly moored by the longitudinal cables 1, as in FIG. 7 the conduits 3 may be moored by using the base 8. That is, the base 8, on which the conduits 3 are fixed, may be moored by the longitudinal cables 1. The longitudinal cables 1 are connected to the anchor cable 7 that is wound around the top of a mountain.

Figure 9:
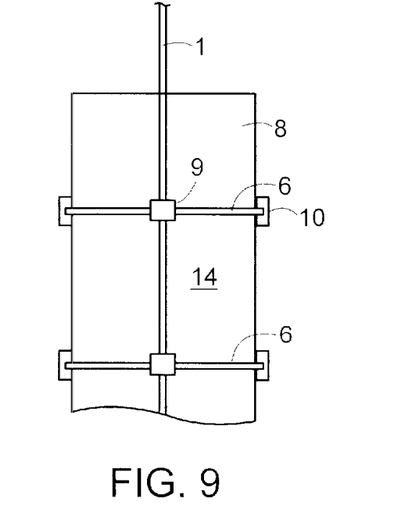
FIG. 9 is a schematic view to show the relationship among a base, a longitudinal cable, and a lateral cable, of an embodiment of the invention.

In the embodiments in FIGS. 7 and 8 one base is moored by a plurality of longitudinal cables. However, one base may be moored by a single longitudinal cable. FIG. 9 is a schematic view to show the back side 14 of the base 8 (which is not a surface on which the conduits are positioned and fixed). In the embodiment as in this figure a plurality of the lateral cables are connected and fixed to the sides of the base 8. Also, a single longitudinal cable 1 is connected to the plurality of the lateral cables.

The conduits etc. as in FIGS. 7, 8, and 9 are the same as those in FIGS. 1–6.

Also, the heavy objects that act as anchors and that are used by the embodiments in FIGS. 1–4 and 6 are the same. The base, on which the conduits are fixed, can be used as anchors. Also, the conduits that are not fixed on the base, but which are moored by cables, can be used as anchors. As an example of the base points that are fixed on a mountain, a big tree or a concrete building that is connected to the ground can be used.

The cables can interlock with each other. Also, they can be connected to each other by known connectors 9. Also, the cables may be connected to the base or the frame (that is constructed by forming a right plate on one side and a left plate on the other side) by using a known joiner 10.

The materials for the base or the frame are not limited to a specific material. For example, concrete and steel can be used.

The method for fixing the conduits to the base is not limited to a specific method. Examples are: 1) a method for driving joining parts 11 that are made of steel and shaped like a semicircle or "]" around the conduits into the base (in FIG. 7), 2) a method for forming projections on. the surface of the base at certain intervals to fit a relatively large part of the conduit to them, and 3) a method for forming holes on both the conduits and the bases so that they are coupled by a bolt and nut. When the frame member is used, the conduits can be fixed on either the basic part or the side plate part of it.

The above embodiments are exemplary, and it is not intended that this invention be limited to them.

What is claimed is:

1. A method for installing a conduit on a mountain comprising:

positioning at least one cable longitudinally on a mountainside along a slope of the mountainside;

mooring at least one conduit to the at least one cable; and connecting an end of the at least one cable to a base point that is fixed to the mountain.

2. A method according to claim 1, wherein the base point is fixed to a ridge of the mountain.

3. A method according to claim 1, wherein the base point is fixed to a top of the mountain.

4. A method according to claim 1, wherein the at least one conduit is moored to the at least one cable by a mooring cable.

5. A method according to claim 1, wherein at least two cables are positioned longitudinally on a mountainside along a slope of the mountainside and wherein at least one lateral cable is used to connect the at least two cables.

6. A method according to claim 5, wherein the at least one conduit is moored by the at least two cables positioned longitudinally and the at least one lateral cable.

7. A method according to claim 5, wherein the at least one conduit is moored by the at least two cables positioned longitudinally or the at least one lateral cable.

8. A method according to claim 5, wherein the at least on conduit is moored by the at least two cables positioned longitudinally and at least one lateral cable through a mooring cable.

9. A method according to claim 5, wherein the at least one conduit is moored by the at least two cables positioned longitudinally or the at least one lateral cable through a mooring cable.

10. A method according to claim 1, wherein the at least one cable positioned longitudinally includes a basic part and a branching part.

11. A method according to claim 1 wherein the at least two cables positioned longitudinally each include a basic part and a branching part.

12. A method for installing a conduit on a substantially conical mountain, the method comprising:

installing an anchoring cable around a top of the substantially conical mountain;

connecting at least one longitudinal cable to the anchoring cable;

installing the at least one longitudinal cable on a mountainside along its slope; and mooring at least one conduit to the at least one longitudinal cable.

13. A method according to claim 12, wherein the at least one conduit is moored to the at least one longitudinal cable by a mooring cable.

14. A method according to claim 12, wherein at least two longitudinal cables are connected to the anchoring cable and installed on a mountain side along its slope and at least one lateral cable connects the at least two longitudinal cables.

15. A method according to claim 14, wherein the at least one conduit is moored by the at least two longitudinal cables and the at least one lateral cable.

16. A method according to claim 14, wherein the at least one conduit is moored by the at least two longitudinal cables or the at least one lateral cable.

17. A method according to claim 14, wherein the at least one conduit is moored by the at least two longitudinal cables and the at least one lateral cable through a mooring cable.

18. A method according to claim 14, wherein the at least one conduit is moored by the at least two longitudinal cables or the at least one lateral cable through a mooring cable.

19. A method according to claim 14, wherein the at least two longitudinal cables each include a basic part and a branching part.

20. A method according to claim 12, wherein the at least one longitudinal cable includes a basic part and a branching part.

* * * * *

UNITED STATES PATENT AND TRADEMARK OFFICE
CERTIFICATE OF CORRECTION

PATENT NO. : 6,742,964 B2
DATED : June 1, 2004
INVENTOR(S) : Tomio Fukui

It is certified that error appears in the above-identified patent and that said Letters Patent is hereby corrected as shown below:

<u>Column 7,</u>
Line 20, replace "on" with -- one --.

Signed and Sealed this

Seventeenth Day of August, 2004

JON W. DUDAS
*Acting Director of the United States Patent and Trademark Office*